Figure 1:
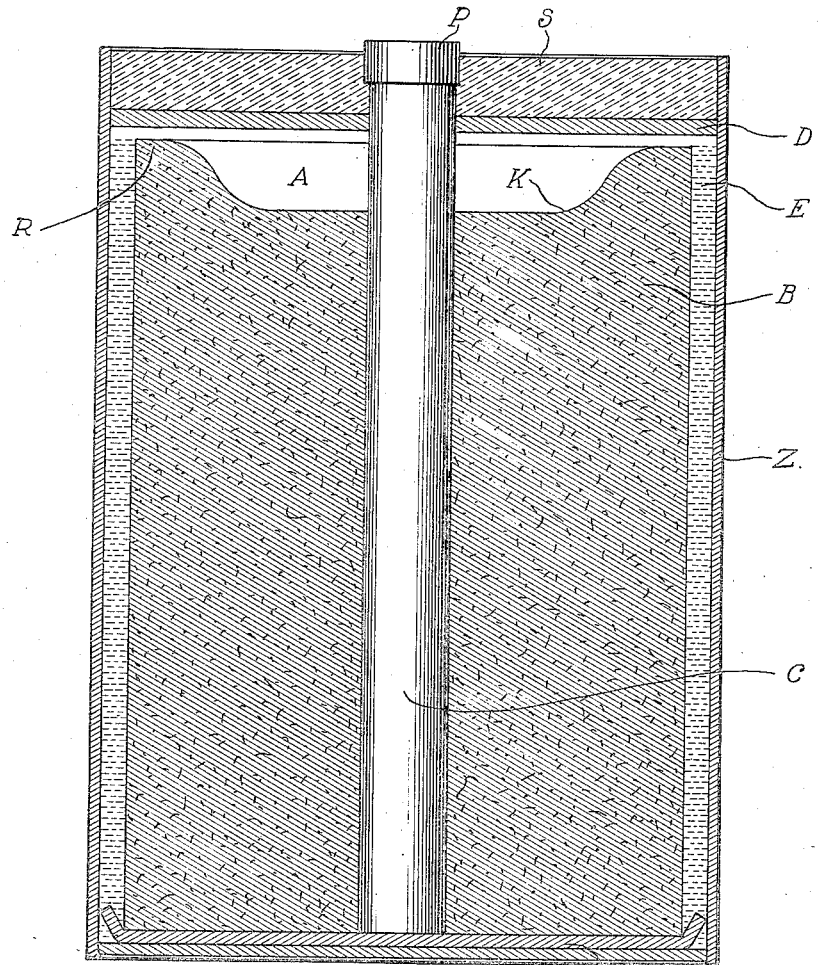

April 26, 1932.  G. W. HEISE  1,855,831

DRY CELL

Filed Aug. 26, 1926

George W. Heise
INVENTOR.

BY
ATTORNEYS.

Patented Apr. 26, 1932

1,855,831

UNITED STATES PATENT OFFICE

GEORGE W. HEISE, OF LAKEWOOD, OHIO, ASSIGNOR TO NATIONAL CARBON COMPANY, INC., A CORPORATION OF NEW YORK

DRY CELL

Application filed August 26, 1926. Serial No. 131,757.

This invention relates to primary batteries such as dry cells, and more particularly to an improved depolarizing bobbin for such cells.

For the proper functioning of a dry cell it has been necessary to leave a so-called air space between the top of the bobbin and the seal to receive the gas evolved by the interaction of the cell elements and to allow room for the liquefaction and expansion of electrolyte paste during heavy drain service. Inasmuch as the top of the depolarizing bobbin, as heretofore made, has been substantially flat, the volume of the air space required above it has limited the height of the bobbin as well as the active area of the zinc container electrode. Since the service capacity of a dry cell is a function of the active electrode area, one of the principal objects of this invention is to increase such area without reducing the air space required for the proper functioning of the cell.

The present method of adjusting the level of the electrolyte paste in a dry cell is cumbersome. Approximately the correct amount of paste is introduced but usually there are some cells which receive too much and others not enough. The excess is removed by suction, and paste is added to those cells containing an insufficient quantity, the removal and addition of the paste being dependent upon the skill of an operator and not particularly efficient. Accordingly, another object of this invention is to provide a cell construction in which the paste level may be more accurately adjusted, and by an automatic operation if desired.

Broadly speaking, these objects are attained by forming a depression or so-called crater centrally within the top end of the depolarizer bobbin, which provides an outer annular rim on the top end of the depolarizing bobbin and an annular channel around the projecting end of the carbon electrode that is partly embedded in the depolarizer. When the improved bobbin is completed and properly set in place in the zinc can or container electrode, the outside surface of the bobbin including that of the crator rim will be disposed opposite the zinc surface and, by making the bobbin of such height that said rim is close to but preferably not in contact with the cell seal, substantially the entire area of the zinc can below the seal will be available active area. Furthermore, the air space afforded by said crator or channel is ample for the proper functioning of the cell and also facilitates the accurate adjustment of the paste level, since by initially adding slightly more than the required amount of paste to every cell, the excess will overflow into the crator from which it may be removed automatically by suction means or otherwise.

Figure 2:
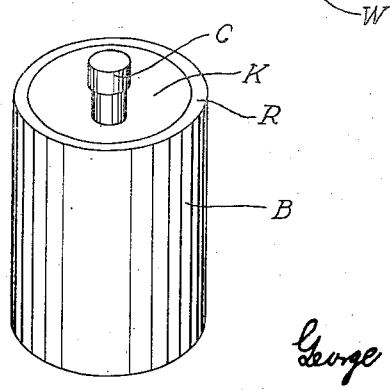

The above and other objects and the novel features of this invention will be apparent from the following description taken with the accompanying drawings, in which Fig. 1 is a vertical central sectional view of a dry cell embodying this invention, and Fig. 2 is a view, on a smaller scale, of an improved bobbin used therein.

Referring to the drawings, Fig. 1 illustrates a dry cell embodying this invention wherein Z designates a zinc can having a tubular body that constitutes the anode of the cell. The cathode or other electrode comprises a cylindrical carbon rod C disposed centrally in the can and provided with a terminal cap P at its upper end, and a suitable conductive depolarizing composition that is molded or otherwise formed about most of the carbon rod to provide the depolarizing bobbin B. The cathode may be supported and centered in the container electrode by a washer W of paper or other suitable material set in the bottom of the zinc can. In order that substantially the entire zinc area below the seal shall become active electrode surface, the zinc bottom may be reinforced and the washer W may be rendered conductive, as set forth in application Serial No. 680,249 filed Dec. 12, 1923 (now Patent No. 1,702,473, granted Feb. 19, 1929) in the names of George W. Heise and Erwin A. Schumacher. An annular compartment between the bobbin B and the can Z is filled with a suitable electrolyte paste E. The cell is closed and sealed by a disk D of paper or the like and a suitable non-conductive sealing composition S.

According to this invention, the top end of the depolarizer bobbin B has a depression or crater K formed centrally therein, such crater having its outer circumference at a distance within the margin of the bobbin so as to provide an annular channel about the projecting end of the carbon rod and leave a comparatively narrow annular rim R at the periphery of the top end of the bobbin. When the bobbin is in place in the completed cell, the upper edge of the rim R is desirably disposed so that there is at least $\frac{1}{16}''$ clearance from the under side of the sealing disk D. The crater K may be substantially hemispherical in shape, and may be formed in the depolarizing composition before or after the latter is formed about the carbon rod, and before or after the depolarizer is introduced into the can. Preferably, the bobbin is formed and then inserted into the zinc can and, after the paste is cooked, the perforated cardboard disc D is jammed over the electrode C and into the can the proper distance from the top edge of the rim R.

When the improved bobbin is completed, the carbon electrode which is considerably smaller in diameter than the crater, is embedded in the body of depolarizing material below the bottom of the crater and projects centrally therethrough and above the plane of the peripheral rim. The annular channel thus provides an air space A that communicates with the electrolyte compartment and is of ample size to take the gas generated during the operation of the cell and to serve as an expansion chamber for the paste. The over-all height of the bobbin is thus increased without reducing the volume of the requisite air space and without changing the dimensions or volume of a standard cell. Consequently, substantially the entire wall of the zinc can up to the seal may be exposed to electrolytic action, with a resulting longer life for the cell. For example, it has been found that a "cratered" bobbin of the same weight and volume as a standard bobbin heretofore used gives at least 10% longer continuous service because of such greater effective electrode area.

The improved bobbin affords a further important advantage in that it permits the electrolyte level to be more accurately adjusted. In assembling this cell, the quantity of electrolyte E filled or otherwise introduced into the electrolyte chamber of every cell is slightly greater than the capacity of said chamber so that, with this bobbin in place, the excess electrolyte will flow inwardly over the rim R into the inner channel or recess, the upper edge of the rim serving as a gage for the height of the electrolyte E. Thereafter, the excess paste collected in the channel may be removed, preferably by a suitable suction device. This leaves every cell accurately filled with paste and provides a more uniform product. Moreover, a more nearly automatic process of producing dry cells is attained.

It will be understood that the improved bobbin may be wrapped or not, as desired. When used in some cells it has been found that the improved bobbin may be advantageously dipped in paste after molding and prior to its insertion in the can, to completely coat the bobbin and thereby improve its mechanical strength. However, this coating is not essential. The interior wall of the zinc can may be lined in the usual or any preferred manner, if desired. Other changes may be made in the details of construction and assembly of the improved cell and bobbin, as disclosed, without departing from the spirit of this invention or sacrificing any of its advantages.

I claim:

1. In a dry cell, the combination of a container electrode; a cathode therein including a depolarizing bobbin; a sealing member; and means forming an air space adjacent said sealing member, such means comprising a depression in the top end of said depolarizing bobbin and spaced from the margin thereof.

2. In a dry cell, the combination of a container electrode; a cathode therein including a depolarizing bobbin; a sealing member; and means forming an air space adjacent said sealing member, such means comprising an annular channel within the margin of the top end of said depolarizing bobbin with an annular rim at the periphery of said end.

3. A method of adjusting the electrolyte level in a dry cell having a container electrode, a cathode including a depolarizing bobbin, and an electrolyte chamber between the bobbin and the container, which comprises forming a depression within the top end of the bobbin communicating with the electrolyte chamber, adding more electrolyte than is required to completely fill the electrolyte chamber and allowing the excess to flow into the depression, and removing the excess electrolyte from said depression.

4. A method of adjusting the electrolyte level in a dry cell having a container electrode, a cathode including a depolarizing bobbin, and an electrolyte chamber between the bobbin and the container, which comprises forming an annular depression within the top end of the bobbin with an annular raised rim at the periphery of the bobbin over which said depression is in communication with the electrolyte chamber, adding more electrolyte than is required to completely fill the electrolyte chamber and allowing the excess to flow over said rim into the depression and removing the excess electrolyte from said depression.

In testimony whereof, I affix my signature.

GEORGE W. HEISE.